(12) United States Patent
Tsugawa

(10) Patent No.: US 8,292,056 B2
(45) Date of Patent: Oct. 23, 2012

(54) ROLLER ASSEMBLY, ROLLER UNIT, AND CONVEYOR APPARATUS

(75) Inventor: Hitoshi Tsugawa, Shinagawa-ku (JP)

(73) Assignee: Hirata Corporation, Tokyo (JP)

( * ) Notice: Subject to any disclaimer, the term of this patent is extended or adjusted under 35 U.S.C. 154(b) by 0 days.

(21) Appl. No.: 13/166,682

(22) Filed: Jun. 22, 2011

(65) Prior Publication Data
US 2011/0253508 A1    Oct. 20, 2011

Related U.S. Application Data

(63) Continuation of application No. PCT/JP2009/050222, filed on Jan. 9, 2009.

(51) Int. Cl.
*B65G 13/071* (2006.01)

(52) U.S. Cl. ....... 193/37; 193/35 R; 193/35 B; 198/780; 198/789; 198/781.04

(58) Field of Classification Search .......... 198/780, 198/789, 781.04; 193/35 R, 35 B, 37
See application file for complete search history.

(56) References Cited

U.S. PATENT DOCUMENTS

| | | | | |
|---|---|---|---|---|
| 3,776,651 A | * | 12/1973 | Peter et al. | 403/248 |
| 4,676,672 A | * | 6/1987 | Tufty | 384/537 |
| 4,706,801 A | * | 11/1987 | Vessey | 198/781.02 |
| 4,861,173 A | * | 8/1989 | Kemp | 384/538 |
| 5,046,869 A | * | 9/1991 | Roberts et al. | 384/537 |
| 5,131,527 A | * | 7/1992 | Huber | 198/782 |
| 5,383,549 A | * | 1/1995 | Mayer | 198/842 |
| 5,558,206 A | * | 9/1996 | Helgerson et al. | 198/781.04 |
| 6,082,528 A | * | 7/2000 | Habberley | 198/842 |
| 6,527,097 B2 | * | 3/2003 | Dreyer | 193/35 A |
| 6,641,512 B2 | * | 11/2003 | Bryant et al. | 492/16 |
| 6,772,874 B2 | * | 8/2004 | Yamashita et al. | 198/781.03 |
| 6,868,961 B2 | * | 3/2005 | Ehlert et al. | 198/781.04 |
| 7,290,649 B2 | * | 11/2007 | Wolkerstorfer | 198/781.05 |
| 7,299,914 B2 | * | 11/2007 | Chung et al. | 198/780 |
| 7,503,450 B2 | * | 3/2009 | Helgerson et al. | 198/781.04 |

(Continued)

FOREIGN PATENT DOCUMENTS
JP    5-319527 A    12/1993
(Continued)

OTHER PUBLICATIONS

International Search Report (PCT/ISA/210) issued on Mar. 17, 2009, by Japanese Patent Office as the International Searching Authority for International Application No. PCT/JP2009/050222.

(Continued)

*Primary Examiner* — Douglas Hess
(74) *Attorney, Agent, or Firm* — Buchanan Ingersoll & Rooney PC

(57) ABSTRACT

This invention provides a roller assembly including a rotary member including a driving shaft portion and a convey roller portion provided with the driving shaft portion, a driving wheel including a hole portion and attached to the driving shaft portion, the driving wheel being driven to rotate, a transmission receiving portion radially extending outward from the driving shaft portion and rotated together with the driving shaft portion, a friction transmission member clamped between the transmission receiving portion and a side surface of the driving wheel and frictionally transmitting a rotational force of the driving wheel to a rotary member, and a biasing portion applying a clamping force between the transmission receiving portion and the side surface of the driving wheel.

11 Claims, 12 Drawing Sheets

U.S. PATENT DOCUMENTS 7,581,630 B2 * 9/2009 Hong ............................. 193/37
8,196,728 B2 * 6/2012 Gagnon ......................... 193/37

FOREIGN PATENT DOCUMENTS

JP          11-059879 A    3/1999
WO    WO 2008/152718 A1    12/2008

OTHER PUBLICATIONS

Written Opinion (PCT/ISA/237) issued on Mar. 17, 2009, by Japanese Patent Office as the International Searching Authority for International Application No. PCT/JP2009/050222.

* cited by examiner

ROLLER ASSEMBLY, ROLLER UNIT, AND CONVEYOR APPARATUS

TECHNICAL FIELD

The present invention relates to a roller assembly formed such that a frictional force is used to stop rotating a roller when the load of a convey target is larger than the convey force of the roller and rotate the roller to convey the convey target when the load of the convey target is smaller than the convey force, a roller unit comprising the roller assembly, and a conveyor apparatus comprising the roller unit, and, more particularly, relates to a roller assembly capable of arbitrarily adjusting the convey force (frictional force), a roller unit, and a conveyor apparatus.

BACKGROUND ART

A roller assembly, roller unit, and conveyor apparatus which convey a convey target must intermittently convey a convey target. For this purpose, there is provided a technique for adjusting an idle load using a frictional force set such that roller rotation is stopped when the load of the convey target is larger than the convey force of the roller and the roller is rotated to convey the convey target when the load of the convey target is smaller than the convey force of the roller.

For example, in PTL1, a sliding bearing is disposed between a driving roller fitted on a shaft portion and a convey roller. When a driving force is transmitted from a driving source to the driving roller, the sliding bearing is driven to rotate upon rotation of the driving roller by a frictional force between the sliding bearing and the driving roller. Upon rotation of the sliding bearing, the driving force is transmitted to the convey roller by the frictional force between the sliding bearing and the convey roller.

CITATION LIST

Patent Literature
PTL1: Japanese Patent Laid-Open No. 5-319527

DISCLOSURE OF INVENTION

Technical Problem

In the technique described in PTL1, however, the load of the convey target loaded by the convey roller is supported by the shaft portion, and the sliding bearing is disposed between the convey roller and the driving roller. For this reason, when the convey roller is shaken upon reception of the frictional force of the convey target or wears upon use over time, the surface pressure between the convey roller and the sliding bearing changes.

Solution to Problem

The objective of the present invention is to reduce the influence of the deformation of a convey roller portion caused by the load of a convey target on frictional transmission performance. Another objective of the present invention is to improve the attaching/detaching efficiency of component parts constituting the roller assembly.

In order to solve the problem described above, according to the present invention, there is provided a roller assembly comprising: a rotary member including a driving shaft portion and a convey roller portion provided with the driving shaft portion, said rotary member being rotatable around an axis of the driving shaft portion; a driving wheel including a hole portion and attached to the driving shaft portion, said driving wheel being driven to rotate; a transmission receiving portion provided with the driving shaft portion, extending radially outward from the driving shaft portion, and rotating together with the driving shaft portion; a frictional transmission member clamped between said transmission receiving portion and a side surface of said driving wheel to frictionally transmit a rotational force of said driving wheel to said rotary member; and biasing means for applying a clamping force between said transmission receiving portion and the side surface of said driving wheel, wherein said driving shaft portion includes a first shaft portion on which said convey roller portion is mounted, a second shaft portion including a diameter smaller than that of said first shaft portion, and an inner hole axially extending through said driving shaft portion and concentric with said driving shaft portion, wherein said transmission receiving portion is disposed at a stepped portion formed between said first shaft portion and said second shaft portion, wherein said driving wheel is disposed on said second shaft portion, and wherein said biasing means comprises: a shaft member inserted into the inner hole; a pushing member disposed on an outer surface of said shaft member on the side of said second shaft portion to push said driving wheel toward said transmission receiving portion; and an elastic member disposed in the inner hole to apply an pushing force for pushing said driving wheel toward said transmission receiving portion to said pushing member through said shaft member.

According to the present invention, there is also provided a roller unit comprising a plurality of roller assemblies, each of the plurality of roller assemblies comprising a rotary member including a driving shaft portion and a convey roller portion provided with the driving shaft portion, said rotary member being rotatable around an axis of the driving shaft portion, a driving wheel including a hole portion and attached to the driving shaft portion, said driving wheel being mounted on the driving shaft portion and being driven to rotate, a transmission receiving portion provided with the driving shaft portion, extending radially outward from the driving shaft portion, and rotating together with the driving shaft portion, a frictional transmission member clamped between said transmission receiving portion and a side surface of said driving wheel to frictionally transmit a rotational force of said driving wheel to said rotary member, and biasing means for applying a clamping force between said transmission receiving portion and the side surface of said driving wheel; said driving shaft portion including a first shaft portion on which said convey roller portion is mounted, a second shaft portion including a diameter smaller than that of said first shaft portion, and an inner hole axially extending through said driving shaft portion and concentric with said driving shaft portion, said transmission receiving portion being disposed at a stepped portion formed between said first shaft portion and said second shaft portion, said driving wheel being disposed on said second shaft portion, said biasing means comprising: a shaft member inserted into the inner hole; a pushing member disposed on an outer surface of said shaft member on the side of said second shaft portion to push said driving wheel toward said transmission receiving portion; and an elastic member disposed in the inner hole to apply an pushing force for pushing said driving wheel toward said transmission receiving portion to said pushing member through said shaft member, the plurality of roller assemblies being disposed such that the convey roller portions are arrayed in a convey direction of a convey target; the roller unit comprising a roller cover member which surrounds the plurality of convey roller portions arrayed in the convey direction; said roller cover member comprising an upper wall portion including a plurality of roller opening portions from which upper portions of the convey roller portions protrude outside, a first side wall portion including a first mounting portion mounted with a first bearing portion which supports the driving shaft portion at one side of each convey roller portion, and a second side wall portion including a second mounting portion mounted with a second bearing portion which supports the driving shaft portion at the other side of each convey roller portion; the driving shaft portion including an extending portion which extends outside the roller cover member; said frictional transmission member and said driving wheel being disposed in said extended portion; and said roller cover member comprising a first cover member including said first side wall portion and a second cover member including said second side wall portion, which are divisible along the convey direction.

According to the present invention, there is also provided a roller unit comprising a plurality of roller assemblies, each of the plurality of roller assemblies comprising a rotary member including a driving shaft portion and a convey roller portion provided with the driving shaft portion, said rotary member being rotatable around an axis of the driving shaft portion, a driving wheel including a hole portion and attached to the driving shaft portion, said driving wheel being mounted on the driving shaft portion and being driven to rotate, a transmission receiving portion provided with the driving shaft portion, extending radially outward from the driving shaft portion, and rotating together with the driving shaft portion, a frictional transmission member clamped between said transmission receiving portion and a side surface of said driving wheel to frictionally transmit a rotational force of said driving wheel to said rotary member, and biasing means for applying a clamping force between said transmission receiving portion and the side surface of said driving wheel; said driving shaft portion including a first shaft portion on which said convey roller portion is mounted, a second shaft portion including a diameter smaller than that of said first shaft portion, and an inner hole axially extending through said driving shaft portion and concentric with said driving shaft portion, said transmission receiving portion being disposed at a stepped portion formed between said first shaft portion and said second shaft portion, said driving wheel being disposed on said second shaft portion, said biasing means comprising: a shaft member inserted into the inner hole; a pushing member disposed on an outer surface of said shaft member on the side of said second shaft portion to push said driving wheel toward said transmission receiving portion; and an elastic member disposed in the inner hole to apply an pushing force for pushing said driving wheel toward said transmission receiving portion to said pushing member through said shaft member, the plurality of roller assemblies being disposed such that the convey roller portions are arrayed in a convey direction of a convey target; the roller unit comprising a plurality of bearing portions each disposed between one end portion of each of the driving shaft portions and each of the convey roller portions to support the driving shaft portion, and a bearing support member which supports said plurality of bearing portions arrayed in the convey direction; the driving shaft portion comprising an extended portion which extends outside said bearing support member at said one end portion; and said frictional transmission member and said driving wheel being disposed in said extended portion.

According to the present invention, there is also provided a conveyor apparatus comprising a plurality of roller units in a convey direction, each of the roller units comprising a plurality of roller assemblies, each of the plurality of roller assemblies comprising a rotary member including a driving shaft portion and a convey roller portion mounted on the driving shaft portion, said rotary member being rotatable around an axis of the driving shaft portion, a driving wheel including a hole portion and attached to the driving shaft portion, said driving wheel being mounted on the driving shaft portion and being driven to rotate, a transmission receiving portion provided with the driving shaft portion, extending radially outward from the driving shaft portion, and rotating together with the driving shaft portion, a frictional transmission member clamped between said transmission receiving portion and a side surface of said driving wheel to frictionally transmit a rotational force of said driving wheel to said rotary member, and biasing means for applying a clamping force between said transmission receiving portion and the side surface of said driving wheel; said driving shaft portion including a first shaft portion on which said convey roller portion is mounted, a second shaft portion including a diameter smaller than that of said first shaft portion, and an inner hole axially extending through said driving shaft portion and concentric with said driving shaft portion, said transmission receiving portion being disposed at a stepped portion formed between said first shaft portion and said second shaft portion, said driving wheel being disposed on said second shaft portion, said biasing means comprising: a shaft member inserted into the inner hole; a pushing member disposed on an outer surface of said shaft member on the side of said second shaft portion to push said driving wheel toward said transmission receiving portion; and an elastic member disposed in the inner hole to apply an pushing force for pushing said driving wheel toward said transmission receiving portion to said pushing member through said shaft member, the plurality of roller assemblies being disposed such that the convey roller portions are arrayed in a convey direction of a convey target; the roller unit comprising a roller cover member which surrounds the plurality of convey roller portions arrayed in the convey direction; said roller cover member comprising an upper wall portion including a plurality of roller opening portions from which upper portions of the convey roller portions protrude outside, a first side wall portion including a first mounting portion mounted with a first bearing portion which supports the driving shaft portion at one side of each convey roller portion, and a second side wall portion including a second mounting portion mounted with a second bearing portion which supports the driving shaft portion at the other side of each convey roller portion; the driving shaft portion including an extending portion which extends outside the roller cover member; said frictional transmission member and said driving wheel being disposed in said extended portion; and said roller cover member comprising a first cover member including said first side wall portion and a second cover member including said second side wall portion, which are divisible along the convey direction; said conveyor apparatus comprising a frame which supports said plurality of roller units, driving means for driving to rotate said driving wheel, and an upper cover member which covers at least upper portions of said extended portion, said driving wheel, and said frictional transmission member; and said upper cover member being formed continuous with said roller cover member and said frame.

According to the present invention, there is also provided a conveyor apparatus comprising a plurality of roller units in a convey direction, each of the roller units comprising a plurality of roller assemblies, each of the plurality of roller assemblies comprising a rotary member including a driving shaft portion and a convey roller portion provided with the driving shaft portion, said rotary member being rotatable around an axis of the driving shaft portion, a driving wheel including a hole portion and attached to the driving shaft portion, said driving wheel being mounted on the driving shaft portion and being driven to rotate, a transmission receiving portion provided with the driving shaft portion, extending radially outward from the driving shaft portion, and rotating together with the driving shaft portion, a frictional transmission member clamped between said transmission receiving portion and a side surface of said driving wheel to frictionally transmit a rotational force of said driving wheel to said rotary member, and biasing means for applying a clamping force between said transmission receiving portion and the side surface of said driving wheel; said driving shaft portion including a first shaft portion on which said convey roller portion is mounted, a second shaft portion including a diameter smaller than that of said first shaft portion, and an inner hole axially extending through said driving shaft portion and concentric with said driving shaft portion, said transmission receiving portion being disposed at a stepped portion formed between said first shaft portion and said second shaft portion, said driving wheel being disposed on said second shaft portion, said biasing means comprising: a shaft member inserted into the inner hole; a pushing member disposed on an outer surface of said shaft member on the side of said second shaft portion to push said driving wheel toward said transmission receiving portion; and an elastic member disposed in the inner hole to apply an pushing force for pushing said driving wheel toward said transmission receiving portion to said pushing member through said shaft member, the plurality of roller assemblies being disposed such that the convey roller portions are arrayed in a convey direction of a convey target; each of said roller units comprising a plurality of bearing portions each disposed between one end portion of each of the driving shaft portions and each of the convey roller portions to support the driving shaft portion, and a bearing support member which supports said plurality of bearing portions arrayed in the convey direction; the driving shaft portion comprising an extended portion which extends outside said bearing support member at said one end portion; said frictional transmission member and said driving wheel being disposed in said extended portion; said conveyor apparatus comprising a frame which supports said plurality of roller units, driving means for driving to rotate said driving wheel, and an upper cover member which covers at least upper portions of said extended portion, said driving wheel, and said frictional transmission member; and said upper cover member being formed continuous with said roller cover member and said frame.

Advantageous Effects of Invention

According to the present invention, the influence of the deformation of the convey roller by the load of the convey target on the frictional transmission performance can be reduced. According to the present invention, the attaching/detaching efficiency of the component parts of the roller assembly can be improved.

BEST MODE FOR CARRYING OUT THE INVENTION

Embodiments of the present invention will be described in detail below with reference to the accompanying drawings. The following embodiments are merely examples for practicing the present invention. The embodiments should be properly modified or changed depending on various conditions and the structure of an apparatus to which the present invention is applied. The present invention should not be limited to the following embodiments.

<First Embodiment>

Figure 1:
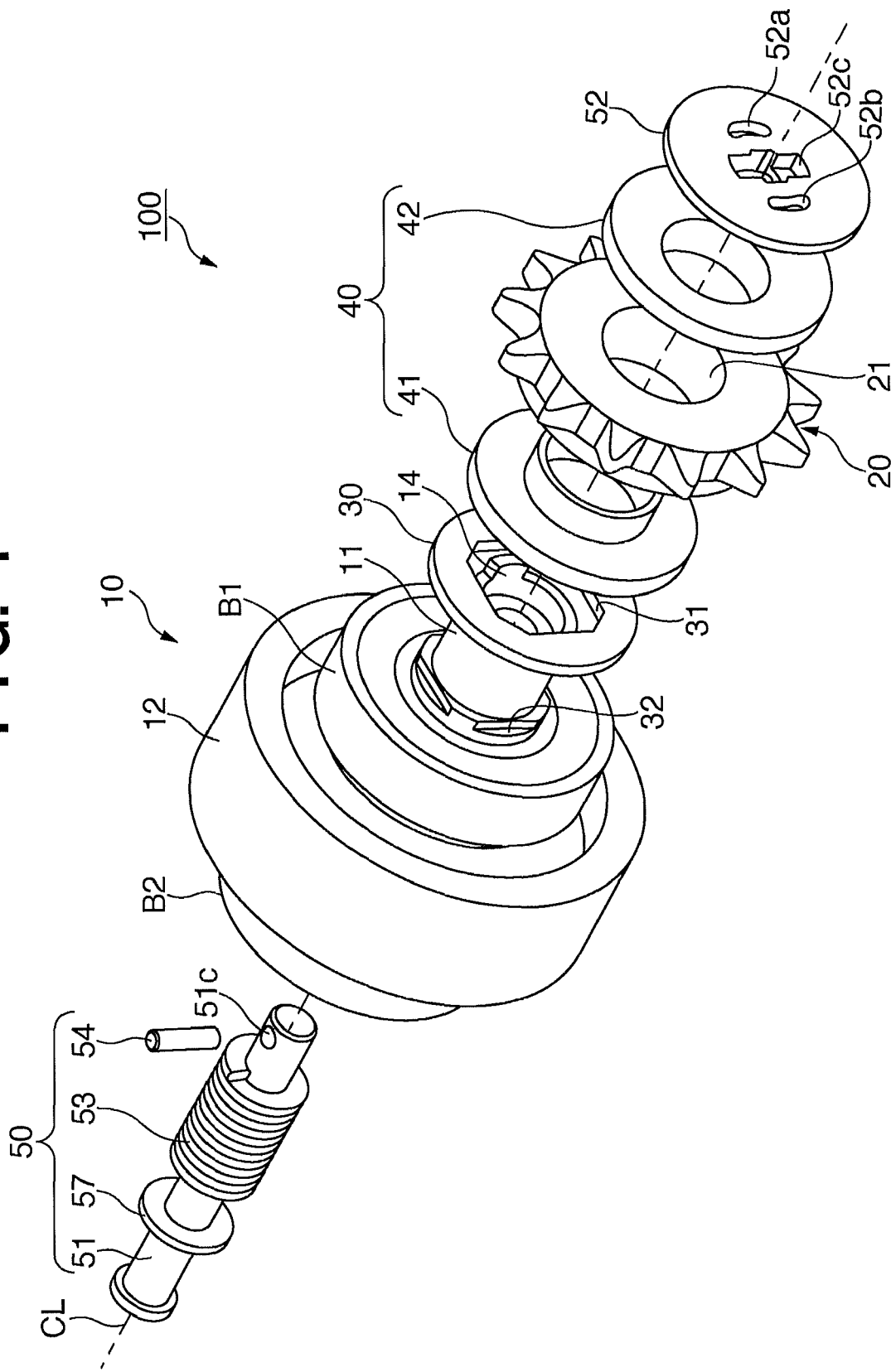
FIG. 1 is an exploded perspective view of a roller assembly 100 according to the first embodiment of the present invention.
Figure 2:
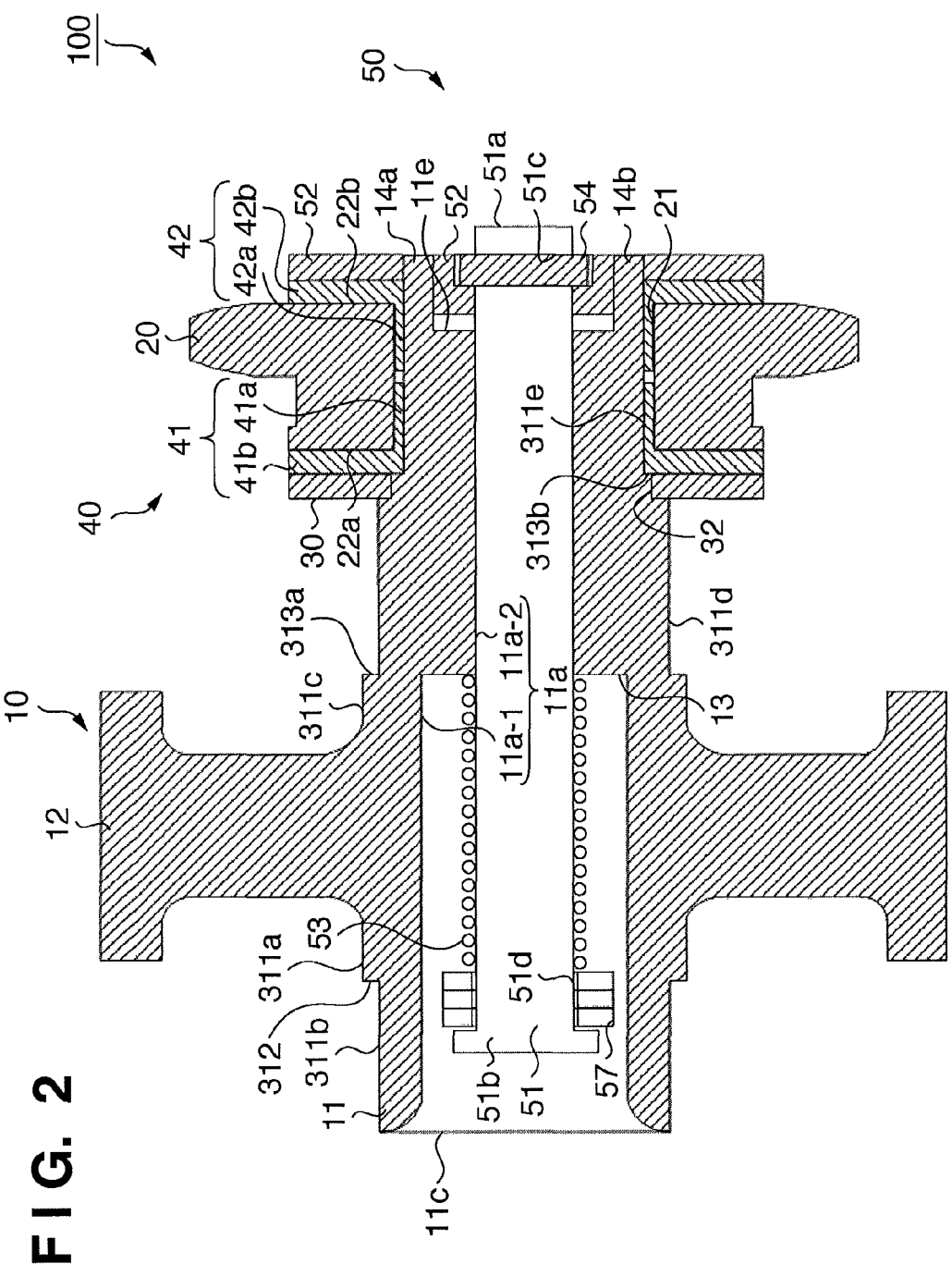
FIG. 2 is a sectional view of the roller assembly 100 according to the first embodiment.

FIG. 1 is an exploded perspective view of a roller assembly 100 according to the first embodiment of the present invention. FIG. 2 is a sectional view of the roller assembly 100 according to the first embodiment.

The roller assembly 100 of the present invention comprises a rotary member 10 including a driving shaft portion 11 and a convey roller portion 12 disposed on the driving shaft portion 11 and rotatable around an axis CL of the driving shaft portion 11, a driving wheel 20 having a hole portion 21 to which the driving shaft portion 11 is inserted so as to be mounted on the driving shaft portion 11 and rotatably driven by the driving shaft portion 11, a transmission receiving portion 30 mounted on the driving shaft portion 11, extending radially outward from the driving shaft portion 11, and rotated together with the driving shaft portion 11, a frictional transmission member 40 clamped between the transmission receiving portion 30 and a side surface 22a of the driving wheel 20 and frictionally transmitting the rotational force of the driving wheel 20 to the rotary member 10, and a biasing portion 50 for applying a clamping force between the transmission receiving portion 30 and the side surface 22a of the driving wheel 20.

The driving shaft portion 11 has an inner hole 11a extending in the axial direction of the driving shaft portion 11 and concentrical with the driving shaft portion 11 (axis CL). The inner hole 11a has a hole portion 11a-1 opened to one end portion 11c of the driving shaft portion 11 and a hole portion 11a-2 smaller than that of the hole portion 11a-1 and opened at the other end portion 11e of the driving shaft portion 11. A stepped portion 13 is formed between the hole portions 11a-1 and 11a-2 due to the difference in sizes of the hole diameters. Two protruding portions 14a and 14b are formed at the other end portion 11e of the driving shaft portion 11 to extend in the longitudinal direction at positions opposing in the radial direction. A stepped portion 312 is formed at one end portion 11c of the driving shaft portion 11, and stepped portions 313a and 313b are formed on the other end portion 11e of the driving shaft portion 11 so as to interpose the convey roller portion 12 therebetween. The driving shaft portion 11 has a large-diameter portion 311a and a small-diameter portion 311b through the stepped portion 312. The driving shaft portion 11 has a large-diameter portion 311c, first small-diameter portion 311d, and second small-diameter portion 311e through the stepped portions 313a and 313b. A keyway (chamfered portion) 32 is formed at the first small-diameter portion 311d facing the stepped portion 313b. A flange portion 41b of the friction transmission member 40 (to be described later) is seated in the stepped portion 312. Note that the driving shaft portion 11 and the convey roller portion 12 are integrally formed to form the rotary member 10 in this embodiment. However, the separate driving shaft portion 11 and convey roller portion 12 may be formed and combined to form the rotary member 10.

The driving wheel 20 is disposed between the convey roller portion 12 and the other end portion 11e of the driving shaft portion 11. The driving wheel 20 comprises a sprocket around which a chain is wound. Note that the driving wheel 20 may be a pulley around which a belt or the like is wound.

Like the driving wheel 20, the annular transmission receiving portion 30 is disposed between the convey roller portion 12 and the end portion 11e of the driving shaft portion 11. According to this embodiment, the transmission receiving portion 30 is disposed between the convey roller portion 12 and the driving wheel 20. The transmission receiving portion 30 has a hole portion 31 filled on the driving shaft portion 11. The hole portion 31 is formed to have a shape (for example, a nearly square shape) different from a circle. The driving shaft portion 11 is formed to have a shape conforming to the keyway 32 of the large-diameter portion 311a of the driving shaft portion 11. When the hole portion 31 is locked in the keyway 32, the transmission receiving portion 30 can be rotated together with the driving shaft portion 11. The frictional transmission member 41 (to be described later) abuts against the surface of the transmission receiving portion 30 on the side of the small-diameter portion 311b.

The transmission receiving portion 30 is a discrete part from the driving shaft portion 11 in this embodiment. When they are combined with each other, they rotate together. However, these components may be integrally formed.

The frictional transmission member 40 comprises a frictional transmission member 41 (first frictional transmission member) disposed between the transmission receiving portion 30 and the side surface 22a of the driving wheel 20 on the side of the transmission receiving portion 30 and a frictional transmission member 42 (second frictional transmission member) disposed between a side surface 22b of the driving wheel 20 on the side of an pushing member 52 (to be described later) and the pushing member 52. The frictional transmission members 41 and 42 frictionally transmit the rotational force of the driving wheel 20 to the rotary member 10.

The frictional transmission members 41 and 42 comprise cylindrical portions 41a and 42a mounted in the hole portion 21 of the driving wheel 20 and flange portions 41b and 42b radially extending outward in the end portions of the driving shaft portion 11 from the cylindrical portions 41a and 42a. The cylindrical portions 41a and 42a are interposed between the peripheral wall (inner peripheral wall of the driving wheel 20) of the hole portion 21 and the driving shaft portion 11. The flange portion 41b is clamped between the transmission receiving portion 30 and the side wall 22a of the driving wheel 20. The flange portion 42b is clamped between the pushing member 52 and the side wall 22b of the driving wheel 20. With this structure, the assembly by pre-assembling the frictional transmission members 41 and 42 and the driving wheel 20 can be improved. The rotational force can be transmitted by the frictional transmission by the cylindrical portions 41a and 42a in the radial direction.

The biasing portion 50 applies the clamping force between the transmission receiving portion 30 and the side surface 22a of the driving wheel 20. The biasing portion 50 comprises a shaft member 51 inserted into the inner hole 11a, an pushing member 52 coupled to the end portion 51a of the shaft member 51 on the side of the hole portion 11a-2 and pushing the driving wheel 20 toward the transmission receiving portion 30, and an elastic member 53 disposed in the hole portion 11a-1 and applying the pushing force to the pushing member 52 through the shaft member 51, thereby pushing the driving wheel 20 toward the transmission receiving portion 30.

The shaft member 51 comprises a shaft portion 51d and a flange-like head portion 51b formed at one end portion (end portion on the side of the hole portion 11a-1) of the shaft portion 51d. The distal end of the shaft portion 51d is inserted into the hole portion 11a-2. A hole portion 51c which receives a locking pin 54 (to be described later) is formed near the distal end of the shaft portion 51d. The hole portion 51c extends in a direction perpendicular to the direction in which the axis CL extends. Note that in this embodiment, only one hole 51c is formed, but a plurality of hole portions may be formed in the longitudinal direction of the shaft portion 51d so as to adjust the biasing force of the elastic member 53 depending on the load of the convey target.

The pushing member 52 is movable in the axial direction of the driving shaft portion 11 and is mounted at the other end portion 11e of the driving shaft portion 11 so as not to rotate with respect to the driving shaft portion 11. More specifically, the pushing member 52 comprises hole portions 52a and 52b which are fitted on the protruding portions 14a and 14b of the driving shaft portion 11 and a groove 52c which receives both the protruding portions of the locking pin 54 inserted into the hole portion 51c. For this reason, the pushing member 52 is not rotatable with respect to the driving shaft portion 11 by inserting the protruding portions 14a and 14b into the hole portions 52a and 52b and inserting both the protruding portions of the locking pin 54 into the groove 52c. Since the locking pin 54 is accommodated in the groove 52c but is not fixed to the pushing member 52, the pushing member 52 is movable in the axial direction of the driving shaft portion 11.

The elastic member 53 comprises a coil spring in this embodiment. The coil spring is mounted on the shaft portion 51d on the side of the head portion 51b and is accommodated in the hole portion 11a-1. One end of the coil spring abuts against a washer 57 mounted on the shaft member 51 on the side of the head portion 51b, and the other end of the coil spring abuts against the stepped portion 13 of the driving shaft portion 11. The coil spring contracts or stretches between the washer 57 and the stepped portion 13. The pushing member 52 always receives the pushing force of the coil spring while the pushing member 52 is assembled in the rotary member 10.

With this structure, since nearly all of the elastic member 53 and the shaft member 51 are disposed in the driving shaft portion 11, an external space (the layout space of the convey roller portion 12 and the driving wheel 20) outside the driving shaft portion 11 can be assured, and the structure can be made compact. In this embodiment, the biasing force of the biasing portion 50 can be adjusted such that the biasing force of the elastic member 53 is stopped by inserting the locking pin 54 into the hole portion 51c of the shaft member 51, and the washer 57 is inserted between the head portion 51b and the elastic member 53. However, the biasing force adjustment is not limited to this. A bolt hole may be formed at the distal end of the shaft member 51d in place of the combination of the hole portion 51c and the locking pin 54, a nut is threadably engaged in this bolt groove, and the nut is rotated to be adjusted, thereby adjusting the biasing force of the elastic member 53.

As described above, according to this embodiment, the frictional transmission members 41 and 42 are clamped by the transmission receiving portion 30 and the pushing member 52 which are independent of the convey roller portion 12, and the frictional transmission members 41 and 42 are pushed against the driving wheel 20. The convey roller portion 12 can rarely be deformed by the load of the convey target, and an influence on the frictional transmission performance can be reduced.

[First Modification of First Embodiment]

In the first embodiment described above, the frictional transmission members 41 and 42 comprise the cylindrical portions 41*a* and 42*a* and the flange portions 41*b* and 42*b*, respectively. However, the frictional transmission members 41 and 42 may be arranged as shown in FIG. 3A.

Figure 3A:
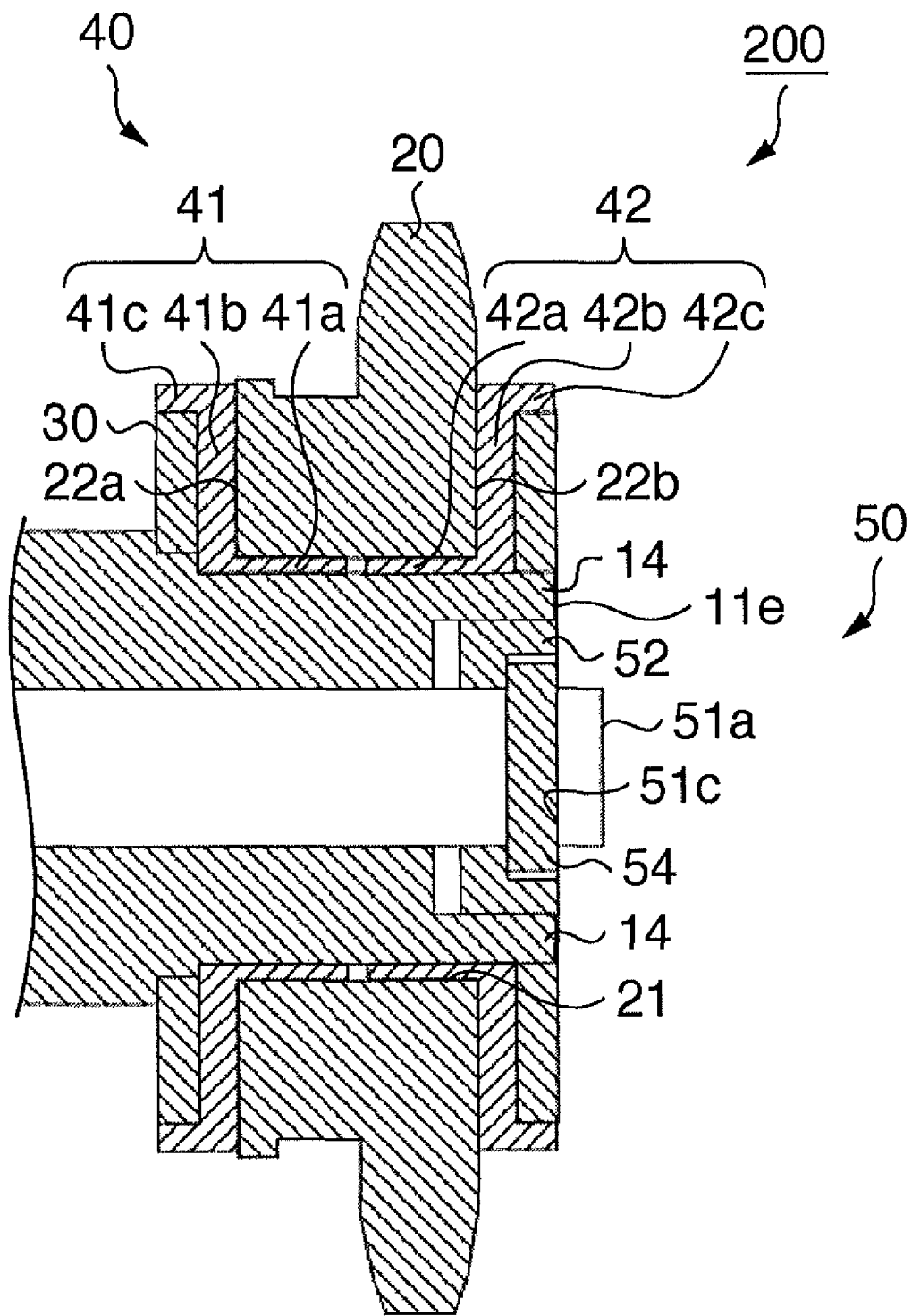
FIG. 3A is a sectional view of a roller assembly 200 according to the first modification of the first embodiment.

FIG. 3A is a sectional view of a roller assembly 200 according to the first modification of the first embodiment. The frictional transmission member 41 comprises a cylindrical portion 41*a* (first cylindrical portion) mounted in the hole portion 21 of the driving wheel 20 and interposed between the peripheral wall of the hole portion 21 and the driving shaft portion 11, a cylindrical portion 41*c* (second cylindrical portion) formed around the periphery of the transmission receiving portion 30, and a flange portion 41*b* extending radially outward from one end side (the side surface 22*a* side of the driving wheel 20) of the cylindrical portion 41*a* and clamped between the transmission receiving portion 30 and the side surface 22*a* of the driving wheel 20 to connect the cylindrical portion 41*a* and the cylindrical portion 41*c*.

The frictional transmission member 42 comprises a cylindrical portion 42*a* mounted in the hole portion 21 of the driving wheel 20 and interposed between the peripheral wall of the hole portion 21 and the driving shaft portion 11, a cylindrical portion 42*c* formed to surround the periphery of the pushing member 52, and a flange portion 42*b* extending radially outward from one end side (the side surface 22*b* side of the driving wheel 20) and clamped between the pushing member 52 and the side surface 22*b* of the driving wheel 20 to connect the cylindrical portion 42*a* and the cylindrical portion 42*c*.

With the above structure, since the cylindrical portion 41*c* is additionally disposed, assembly property by pre-assembling the frictional transmission member 41 and the transmitted member 30 can be improved. Similarly, since the cylindrical portion 42*c* is additionally disposed, the assembly property by pre-assembling the frictional transmission member 42 and the pushing member 52 can be improved. In addition, the rotational force can be transmitted by frictional transmission in the radial direction of cylindrical portions 41*d* and 42*d*. Furthermore, the cylindrical portion 41*c* can prevent the portion (frictional sliding surface) between a flange portion 41*e* and the transmission receiving portion 30 from entering oil, dust, or the like. The cylindrical portion 42*c* can prevent the portion (frictional sliding surface) between a flange portion 42*b* and the pushing member 52 from entering oil, dust, and the like, thereby maintaining the frictional transmission performance.

[Second Modification of First Embodiment]

In the first embodiment described above, the pushing member 52 is not rotatable with respect to the driving shaft portion 11. In this modification, however, as shown in FIG. 3B, the pushing member 52 may be rotatable with respect to the driving shaft portion 11.

Figure 3B:
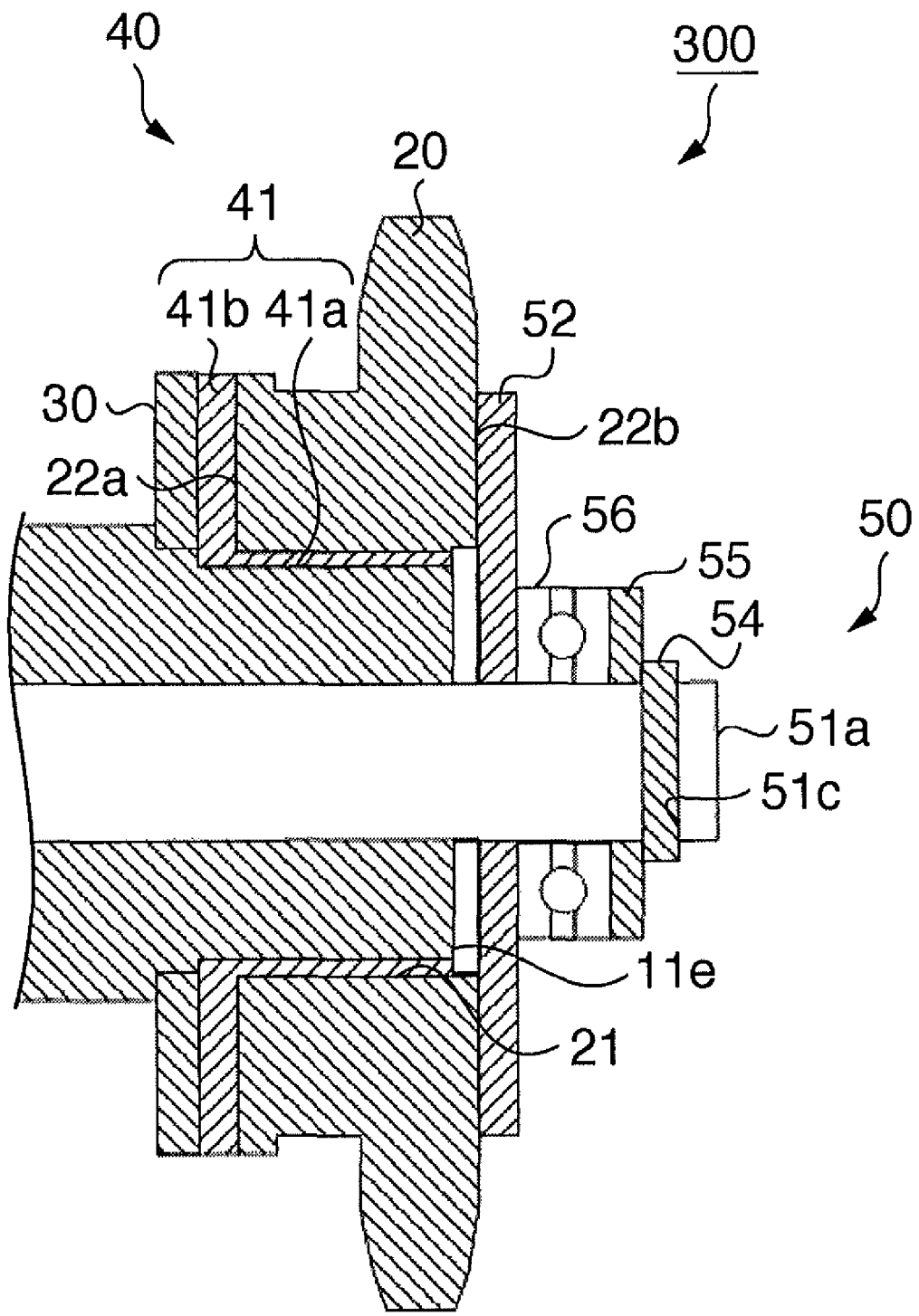
FIG. 3B is a sectional view of a roller assembly 300 according to the second modification of the first embodiment.

FIG. 3B is a sectional view of a roller assembly 300 according to the second modification of the first embodiment. According to this modification, the frictional transmission member 40 comprises only the frictional transmission member 41 disposed on the side surface 22*a* of the driving wheel 20. The cylindrical portion 41*a* extends until the other end portion 11*e* of the driving shaft portion 11.

The biasing portion 50 comprises a thrust bearing 56 mounted on the end portion 51*a* side of the shaft member 51 and an annular regulating portion 55 in addition to the structure of the biasing portion 50 shown in the first embodiment. The thrust bearing 56 abuts against the end surface of the pushing member 52 on the side opposite to the driving wheel 20. The regulating portion 55 abuts against the end face of the thrust bearing 56 on the side opposite to the thrust bearing 56.

In the first embodiment, the protruding portions 14*a* and 14*b* are inserted into the hole portions 52*a* and 52*b* of the pushing member 52, and the locking pin 54 is accommodated into the groove 52*c*, so the pushing member 52 is not rotatable with respect to the driving shaft portion 11. On the other hand, in this modification, the driving shaft portion 11 does not comprise the protruding portions 14*a* and 14*b*, and the pushing member 52 does not comprise the hole portions 52*a* and 52*b* and the groove 52*c*. When the pushing force is applied from the regulating portion 55 to the pushing member 52 through the thrust bearing 56, the driving wheel 20 is pressed toward the convey roller 12 side, and the frictional transmission member 41 (flange portion 41*b*) is clamped between the driving wheel 20 and the transmission receiving portion 30. The regulating portion 55 comprises, for example, a washer and is movable in the axial direction of the shaft member 51. The regulating portion 55 receives the pushing force toward the convey roller portion 12 side at both the protruding portions of the locking pin 54.

This structure provides a simple structure by which the driving wheel 20 and the shaft member 51 do not rotate together.

<Second Embodiment>

The first embodiment has described the roller assembly 100. In this embodiment illustrated in FIG. 4, a roller unit U100 comprising a roller assembly 100 will be described below. Since the roller assembly 100 of the roller unit U100 of this embodiment is the same as the roller assembly 100 of the first embodiment, the same reference numerals as in the first embodiment denote the same parts in the second embodiment, and a detailed description thereof will be omitted.

Figure 4:
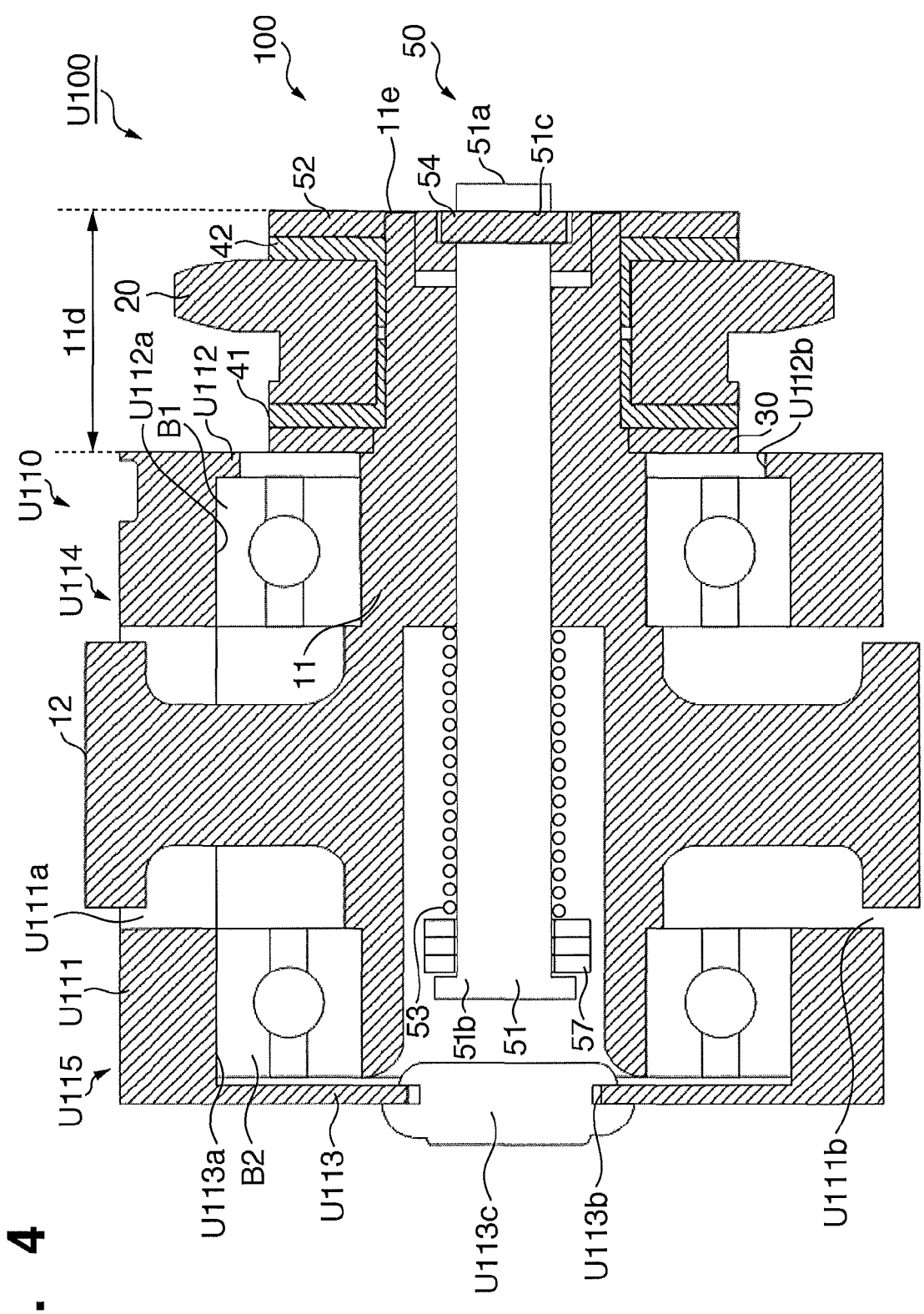
FIG. 4 is a sectional view of a roller unit U100 according to the second embodiment.
Figure 5:
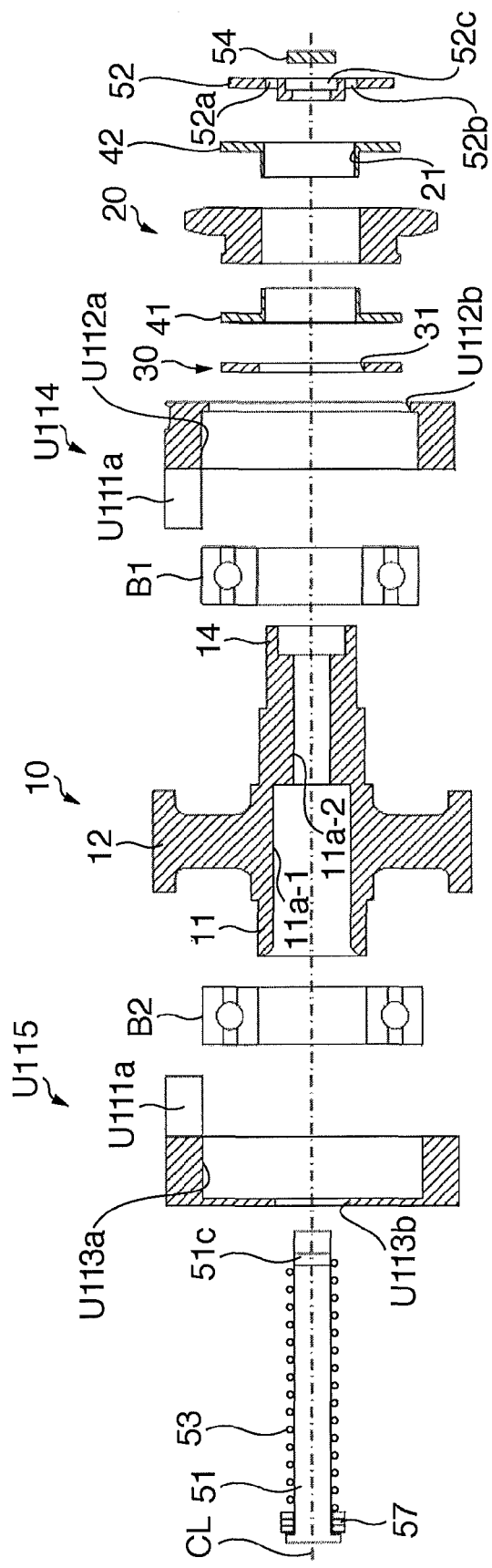
FIG. 5 is an exploded sectional view of the roller unit U100.
Figure 6:
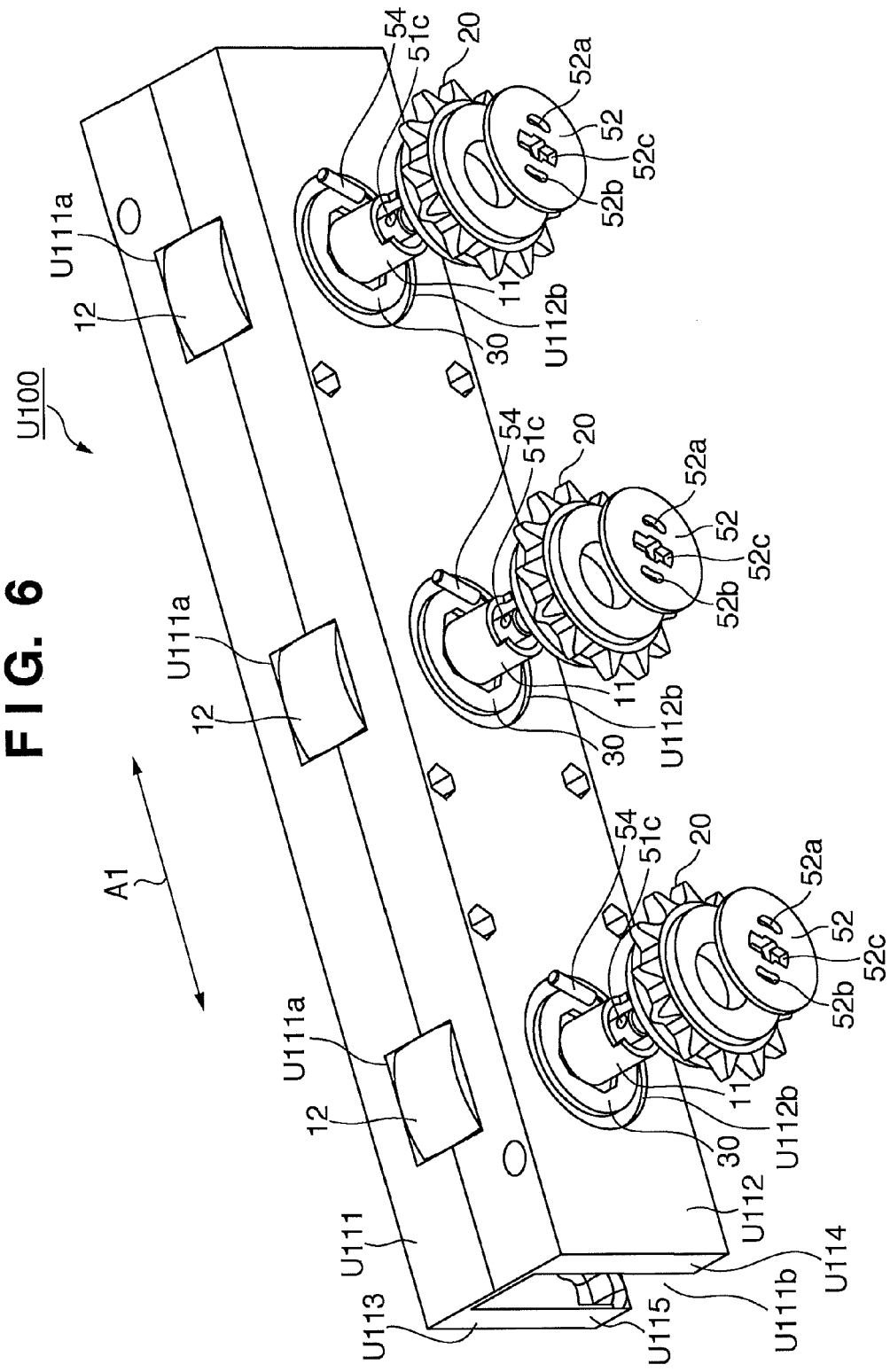
FIG. 6 is a perspective view showing the attachment/detachment mechanism of the roller assembly 100.

FIG. 4 is a sectional view of the roller unit U100 according to the second embodiment. FIG. 5 is an exploded sectional view of the roller unit U100. FIG. 6 is a perspective view showing an attachment/detachment unit of the roller assembly 100.

As shown in FIG. 6, the roller unit U100 comprises a plurality of roller assemblies 100 (three assemblies in this embodiment) shown in the first embodiment. The respective convey roller portions 12 of the plurality of roller assemblies 100 are arranged in a convey direction A1 of the convey target. The roller unit U100 comprises a roller cover member U110 which surrounds the plurality of convey roller portions 12 arranged in the convey direction A1.

The roller cover member U110 comprises an upper wall portion U111, a side wall portion U112 (first side wall portion), a side wall portion U113 (second side wall portion), and a lower wall portion U116. The roller cover member U110 has a structure in which it is divisible into halves (half division structure) in a direction perpendicular to the convey direction A1. In other words, the roller cover member U110 comprises a combination of right and left sectionally U-shaped cover members (first and second cover members) U114 and U115 facing each other. The facing portions of the first and second cover members U114 and U115 are spaced apart from each other to form a slit U111b. The lower portions of the convey roller portions 12 extend outward from the slit U111b. The upper wall portion U111 comprises a plurality of roller opening portions U111a from which the upper portions of the convey roller portions 12 extend outward. The side wall portion U112 comprises three mounting portions U112a (first mounting holes) in which a bearing portion B1 (first bearing portions) which axially supports a small-diameter portion 311b of the driving shaft portion 11 is mounted. The side wall portion U113 comprises three mounting portions U113a (second mounting holes) in which the bearing portion B2 (second bearing portion) which axially supports a first small-diameter portion 311d of the driving shaft portion 11 is mounted.

A mounting hole U112b formed in the side wall portion U112 is a hole from which the other end portion 11e of the driving shaft portion 11 extends. A mounting hole U113b formed in the side wall portion U113 is a hole from which an axial member 51 and an elastic member 53 can be extracted from the roller cover member U110 and is usually closed with a cap U113c.

The bearing portions B1 and B2 are radial bearings which support the radial loads of the driving shaft portion 11. The bearing portions B1 and B2 support the driving shaft portion 11 at the two sides of the convey roller portions 12. In this case, the number of bearing portions B1 and B2 can be changed in accordance with the load to be supported.

The driving shaft portion 11 comprises an extended portion 11d (see FIG. 4) extending outward from the roller cover member U110. A driving wheel 20 into which a transmission receiving portion 30 and frictional transmission members 41 and 42 are incorporated, and an pushing member 52 are mounted in the extended portion 11d.

As described above, according to this embodiment, the roller cover member U110 can prevent dust and oil from entering into the driving shaft wheel 11 and the convey roller portion 12 in the roller cover member U110. Even if dust or oil enters, the bearing portion B1 and the transmission receiving portion 30 can prevent movement of the dust and oil toward the driving wheel 20. In addition, since the roller cover member U110 is divisible, the maintenance can be improved. Furthermore, by removing the cap U113c shown in FIG. 4 and removing a locking pin 54 fitted in a groove 52c, as shown in FIG. 6, the frictional members 41 and 42 and the driving wheel 20 can be maintained without removing the roller cover member U110.

[Modification of Second Embodiment]

Note that in the second embodiment described above, the bearing portions B1 and B2 are disposed on both the sides of the convey roller portion 12. However, as in this modification shown in FIG. 7, the bearing portion B1 may be disposed on only one side (the other end portion 11e side of the driving shaft portion 11) of the convey roller portion 12 in the driving shaft portion 11.

Figure 7:
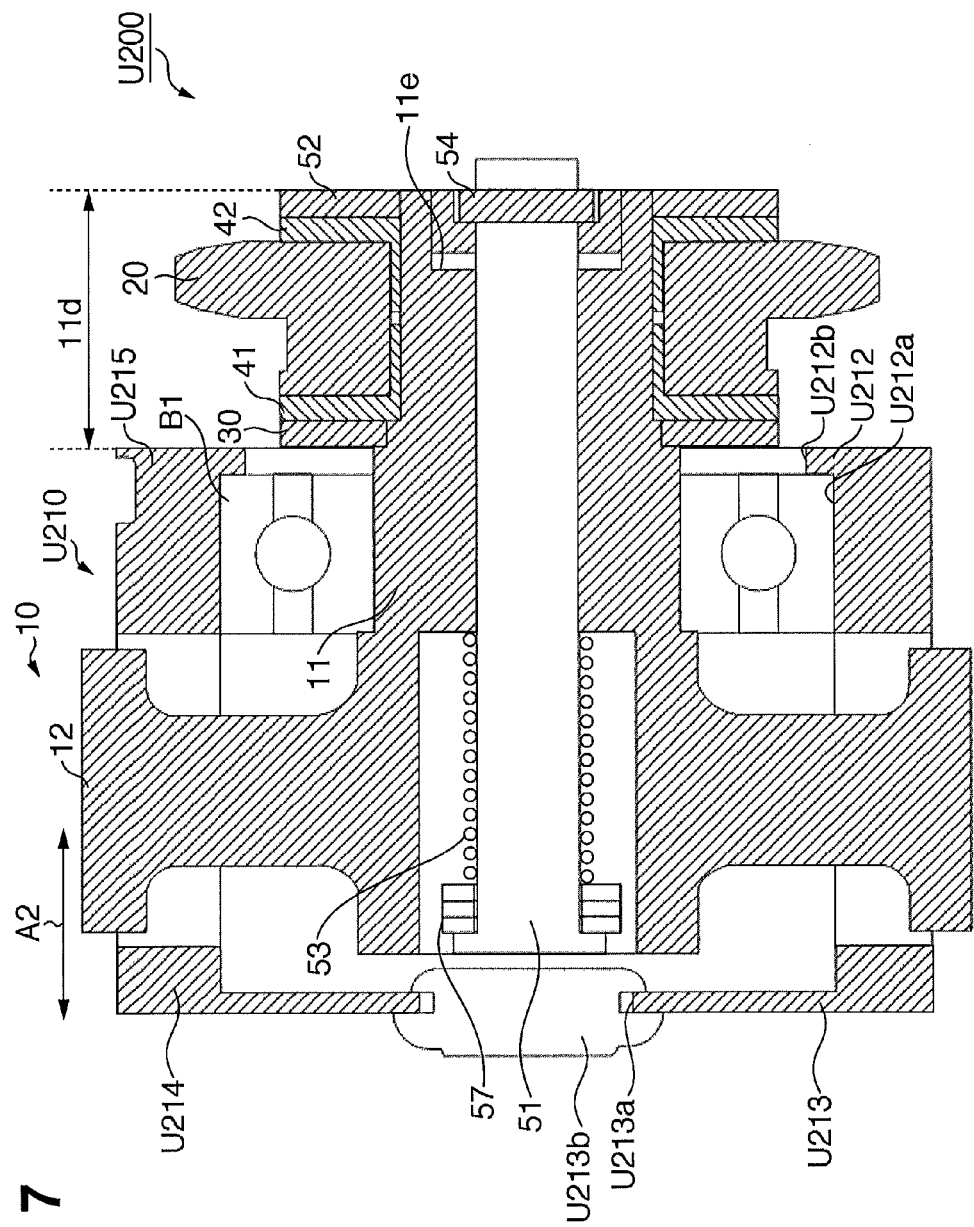
FIG. 7 is a sectional view of a roller unit U200 according to a modification of the second embodiment.

FIG. 7 is a sectional view of a roller unit U200 according to the modification of the second embodiment. The roller unit U200 comprises three roller assemblies 100, a plurality of bearing portions B1 disposed between the other end portions 11e of the respective driving shaft portions 11 and the convey roller portions 12, respectively, and a bearing support member U210 which supports the plurality of bearing portions B1 arrayed in the convey direction.

The bearing support member U210 has basically the same structure as the roller cover member U110 of the second embodiment described above. The bearing support member U210 comprises a support member U214 including a side wall portion U213 and a support member U215 including the side wall portion U213. That is, the bearing support member U210 is divisible in a direction A2 perpendicular to the convey direction.

A side wall portion U212 has a mounting hole U212a in which the bearing portion B1 which supports each rotary member 10 on the other end portion 11e side of the driving shaft portion 11 is mounted. According to this modification, since the bearing portion B2 is not disposed (that is, cantilevered), the side wall portion U213 has only a hole portion U213a for extracting the shaft member 51 and the elastic member 53 from the bearing support member U210. The hole U213a is usually closed with a cap U213b.

Note that the bearing support member U210 supports the bearing portion B2 and has a function as a cover member which covers the periphery of the driving roller portion 12. For this reason, the bearing support member U210 comprises the support members U214 and U215. If the bearing portion B1 can be supported, the periphery of the driving roller portion 12 need not be covered.

The driving shaft portion 11 has an extended portion 11d extending outward from the bearing support member U210 on the other end portion 11e side. The driving wheel 20 incorporating the transmission receiving portion 30 and the frictional transmission members 41 and 42, and pushing member 52 are attached to the extended portion 11d.

With the above structure, the bearing portion B1 is interposed between the convey roller portion 12 and the frictional transmission members 41 and 42. This can prevent the convey roller portion 12 from deforming due to the load of the convey target, thereby further reducing the influence on the frictional transmission performance. In addition, the frictional transmission members 41 and 42 and the driving wheel 20 can be maintained without removing the bearing support member U210. The number of constituent components can be reduced, and the work support surface of the convey roller portion 12 can be widened to more stably transmit the rotational driving force to work.

The structures described in the first and second modifications of the first embodiment may be applied to the structure of the second embodiment. In addition, the structure of the roller assembly used in the modification of the second embodiment can be applied as a modification of the first embodiment.

<Third Embodiment>

In the second embodiment described above, the driving shaft portion 11 incorporates the elastic member 53. However, as in this embodiment shown in FIG. 8, an elastic member 53 may be disposed outside a driving shaft portion 11.

Figure 8:
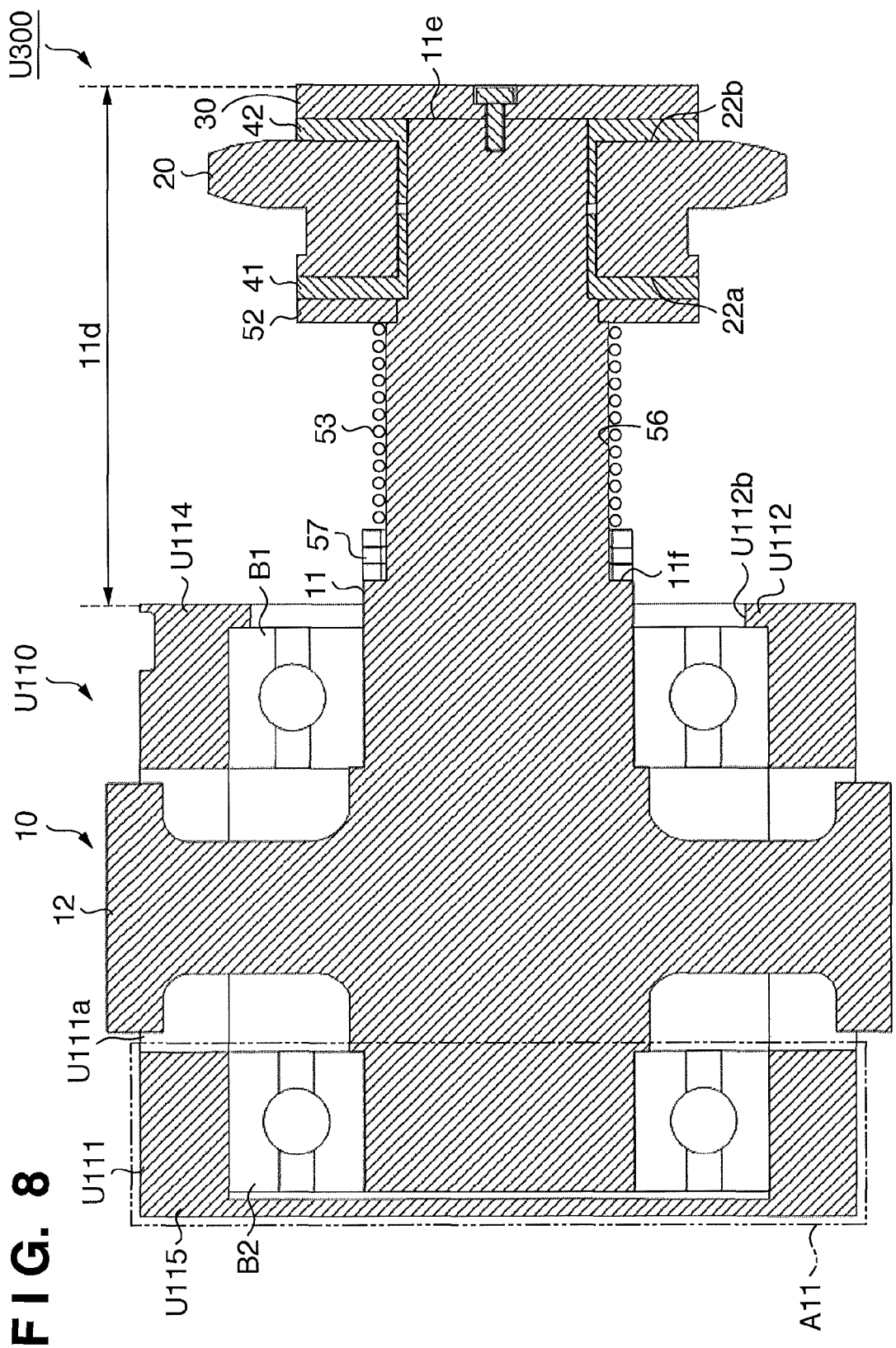
FIG. 8 is a sectional view of a roller unit U300 according to the third embodiment.

FIG. 8 is a sectional view of a roller unit U300 according to the third embodiment. A driving wheel 20 is mounted at a position on the other end portion 11e side of the driving shaft portion 11. A transmission receiving portion 30 is disposed in contact with the other end portion 11e of the driving shaft portion 11.

A biasing portion 50 comprises the elastic member 53 disposed at nearly the central portion of the driving shaft portion 11 to apply a clamping force, and an pushing member 52 disposed between the driving wheel 20 and the elastic member 53, movable along the axial direction of the driving shaft portion 11, and mounted on the driving shaft portion 11 not to be rotatable.

The elastic member 53 is disposed nearer to a convey roller portion 12 than the driving wheel 20. That is, the elastic member 53 comprises, for example, a coil spring sandwiched between the transmission receiving portion 30 and a stepped portion 11*f* formed in the driving shaft portion 11 near the end portion of a cover member U114. The coil spring is then mounted on the driving shaft portion 11. A biasing force adjustment washer 57 is interposed between the stepped portion 11*f* and the elastic member 53.

The pushing member 52 is fixed to the end portion 11*e* of the driving shaft portion 11 with a bolt and the like while being extended from the driving shaft portion 11 in the peripheral direction. The pushing member 52 functions as a stopper for the driving wheel 20 and the frictional transmission members 41 and 42. For this reason, when the elastic member 53 presses the transmission receiving portion 30 toward the end portion 11*e* of the driving shaft portion 11, the pushing force is applied to the frictional transmission members 41 and 42 and the driving wheel 20.

Since the elastic member 53 is disposed outside the driving shaft portion 11, i.e., outside a roller cover member U110, no hole is formed in a cover member U115 to extract a shaft member 51 and the elastic member 53 from the roller cover member U110.

As described above, according to this embodiment, the transmission receiving portion 30, the driving wheel 20, and the elastic member 53 can be removed from the end portion 11*e* side of the driving shaft portion 11, thereby improving maintenance. Frictional transmission takes place at two places, and the frictional transmission force can increase with a small amount of biasing.

[Modification of Third Embodiment]

Figure 9:
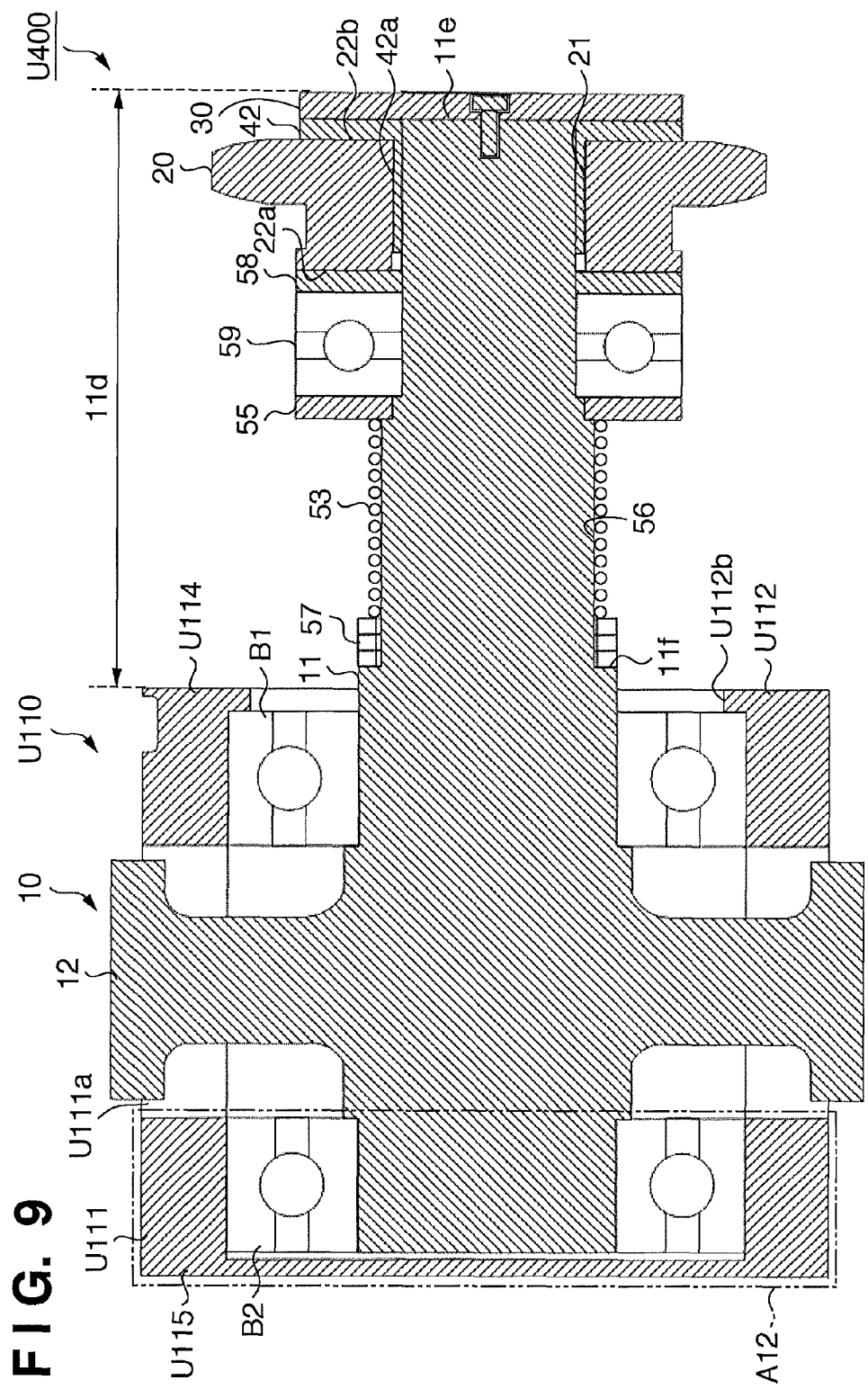
FIG. 9 is a sectional view of a roller unit U400 according to a modification of the third embodiment.

In the third embodiment described above, the two frictional transmission members 41 and 42 are used to transmit the driving force of the driving wheel 20 to the rotary member 10. However, like a modification shown in FIG. 9, the driving force of the driving wheel 20 may be transmitted to the rotary member 10 using only one frictional transmission member 42. FIG. 9 is a sectional view of a roller unit U400 according to the modification of the third embodiment.

According to this modification, a cylindrical portion 42*a* of the frictional transmission member 42 is formed over nearly the entire range of a hole portion 21 of the driving wheel 20 because the frictional transmission member 41 is not used.

The biasing portion 50 comprises an elastic member 53 mounted on the driving shaft portion 11 at nearly its central portion to apply a clamping force, an pushing member 58 and a regulating portion 55 which are disposed between the driving wheel 20 and the elastic member 53 and mounted on the driving shaft portion 11 to be movable in the axial direction of the driving shaft portion 11, and a thrust bearing 59 interposed between the pushing member 58 and the regulating portion 55 and to which the driving shaft portion 11 is inserted. The pushing member 58 is disposed on the driving wheel 20 side, while the regulating portion 55 is disposed on the elastic member 53 side.

The elastic member 53 is fitted on an extended portion 11*d* of the driving shaft portion 11 on the side nearer to the convey roller portion 12 than the driving wheel 20. One end of the elastic member 53 abuts against the stepped portion 11*f* of the driving shaft portion 11 through the washer 57, and the other end of the elastic member 53 abuts against the regulating portion 55. The elastic member 53 stretches or contracts between the stepped portion 11*f* and the regulating portion 55. The pushing force of the elastic member 53 is usually applied to the regulating portion 55 in a state wherein the regulating member 55 is assembled in the rotary member 10.

The pushing member 58 is disposed on the end portion 11*e* side of the driving shaft portion 11 with respect to the regulating portion 55. The thrust bearing 59 is interposed between the regulating portion 55 and the pushing member 58. When the elastic member 53 biases the regulating portion 55 toward the end portion 11*e* side of the driving shaft portion 11, the regulating portion 55 biases the pushing member 58 toward the end portion 11*e* side of the driving shaft portion 11 through the bearing 59. For this reason, the driving wheel 20 and the frictional transmission member 42 are clamped between the transmission receiving portion 30 and the pushing member 58.

This structure can implement a structure in which the driving wheel 20 and the elastic member 53 do not rotate together.

Note that in the third embodiment described above, as shown in FIG. 8, the elastic member 53 is disposed outside the driving shaft portion 11, and bearing portions B1 and B2 support the driving shaft portion 11 at both sides (fixed-fixed shaft portion). However, the structure of a portion A11 indicated by a chain double-dashed line in FIG. 8 can be omitted, and the driving shaft portion 11 may be supported by only the bearing portion B1 (cantilevered).

Similarly, in the modification of the third embodiment described above, as shown in FIG. 9, the elastic member 53 is disposed outside the driving shaft portion 11, and the bearing portions B1 and B2 support the driving shaft portion 11 at both sides (fixed-fixed shaft portion). However, the structure of a portion A12 indicated by a chain double-dashed line in FIG. 9 can be omitted, and the driving shaft portion may be supported by only the bearing portion B1 (cantilevered).

<Fourth Embodiment>

The first embodiment described above has exemplified the roller assembly 100, and the second embodiment described above has exemplified the roller unit U100 including the roller assemblies 100. The fourth embodiment will exemplify a conveyor apparatus C100 including a roller unit U100 shown in FIG. 10. Note that the structure of the roller unit U100 is the same as in the second embodiment, the same reference numerals as in the second embodiment denote the same parts in the fourth embodiment, and a detailed description thereof will be omitted.

Figure 10:
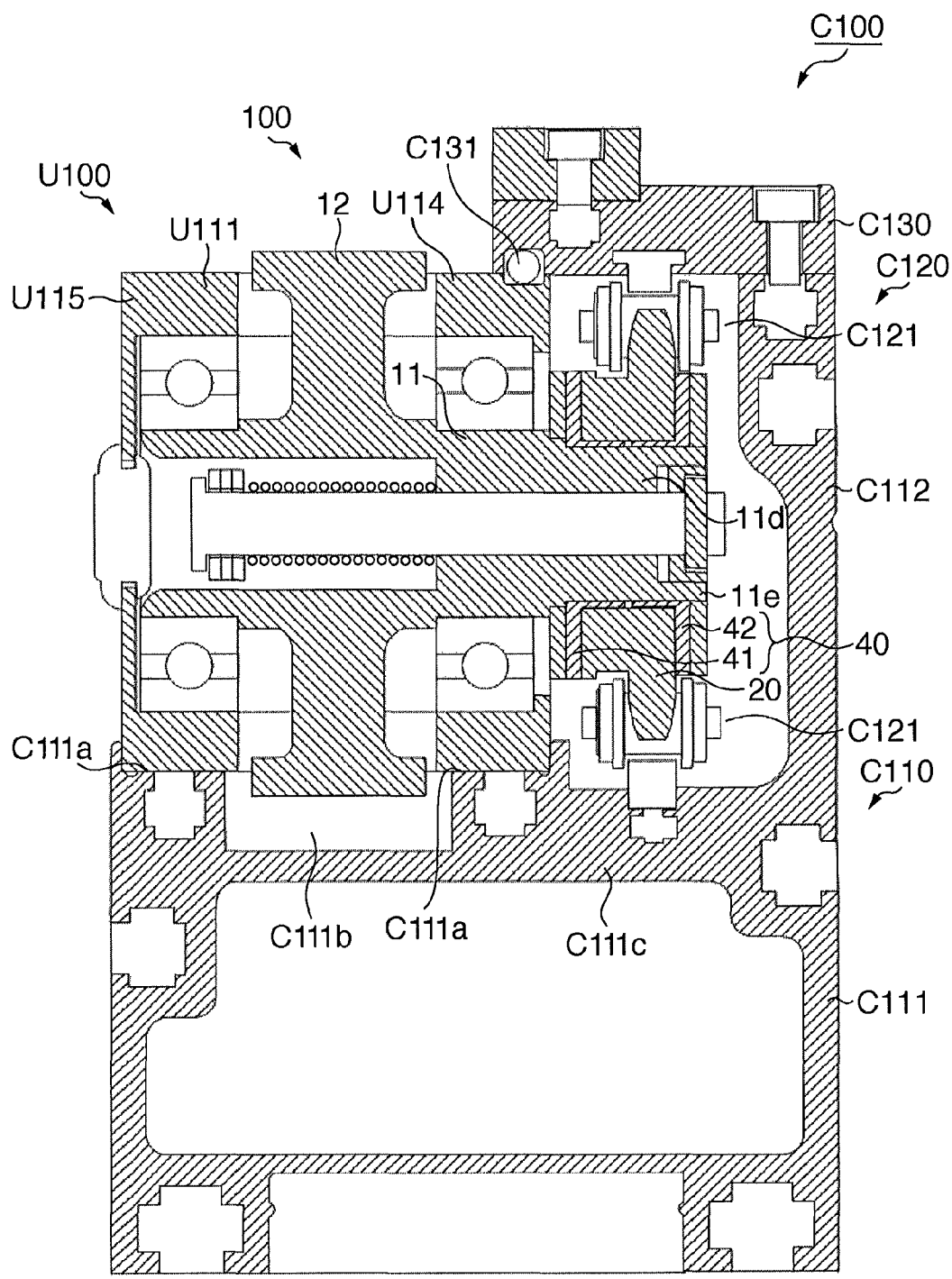
FIG. 10 is a sectional view of a conveyor apparatus C100 according to the fourth embodiment.

FIG. 10 is a sectional view of the conveyor apparatus C100 according to the fourth embodiment. The conveyor apparatus C100 comprises a plurality of roller units U100 each having a plurality of roller assemblies 100 in the convey direction (a direction perpendicular to the drawing surface in FIG. 10). The number of roller units U100 is determined by the length of a convey line.

The conveyor apparatus C100 comprises a frame C110 which supports the plurality of roller units U100, a driving portion C120 which drives to rotate a driving wheel 20, and an upper cover member C130 which covers at least the upper portions of an extended portion 11*d*, the driving wheel 20, and a frictional transmission member 40.

The frame C110 comprises a support portion C111 which supports the roller unit U100 upward and an upward extending portion C112 which extends upward from the support portion C111 and is lateral to the roller unit U100. The frame C110 is formed by, for example, die casting.

The support portion C111 comprises a seat portion C111*a* formed to dispose cover members U114 and U115 of the roller unit U100, and a roller escape portion C111*b* formed to prevent interference with the convey roller portion 12. The upward extending portion C112 extends upward adjacent to the other end portion 11*e* of a driving shaft portion 11.

The driving portion C120 comprises a chain C121 looped around the driving wheel 20 and a driving motor (not shown) which drives to rotate the chain C121. In this embodiment, since the driving wheel 20 is a sprocket, the driving force is transmitted using the chain. If the driving wheel 20 is a pulley, a belt may be used. Alternatively, the driving wheel 20 may be a gear, another gear may be disposed to mesh with the driving wheel 20, and the driving motor may be rotated by the other gear.

The upper cover member C130 is formed continuously with the cover member U114 and the frame C110. In this embodiment, the upper cover member C130 extends across the upper wall portion U111 and the upward extending portion C112 of the cover member U114 and is fixed to the frame C110 with a bolt and the like. The upper cover member C130 abuts against an upper wall portion U111 of the cover member U114 through a seal member C131 which prevents entrance of oil or the like.

As described above, according to this embodiment, the layout space of a convey roller portion 12 is separated from the layout space of the driving wheel 20 and frictional transmission members 41 and 42 to prevent entrance of oil and dust.

[Modification of Fourth Embodiment]

The conveyor apparatus C100 shown in the above fourth embodiment has explained to comprise the roller units U100 described with reference to the second embodiment. The conveyor apparatus C100 may comprise the structure explained in the third embodiment and its modification and any other structure.

Figure 11:
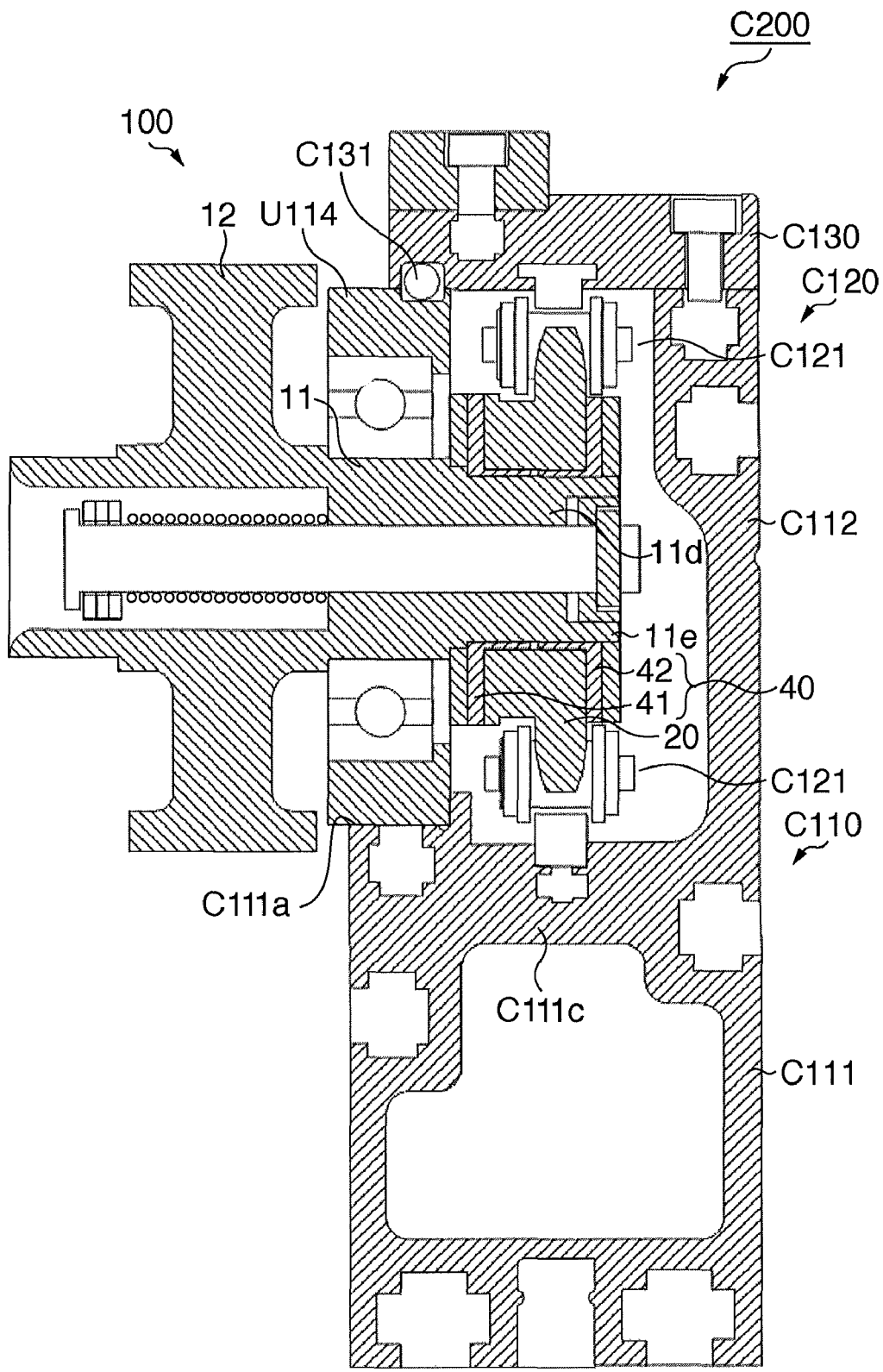
FIG. 11 is a sectional view of a conveyor apparatus C200 according to a modification of the fourth embodiment.

For example, in the fourth embodiment described above, the (fixed-fixed) roller unit U100 is used in which the bearing portions B1 and B2 support the driving shaft portion 11 at both sides. However, like the modification shown in FIG. 11, a roller unit can be used in which the driving shaft portion 11 is supported by only the bearing portion B2. FIG. 11 is a sectional view showing a conveyor apparatus C200 according to the modification of the fourth embodiment.

The conveyor apparatus C200 is obtained such that the cover member U115 and the bearing portion B2 are omitted from the structure described with reference to the fourth embodiment, and the roller assembly 100 is disposed to protrude from the frame C110. Even in this case, the layout space of the convey roller portion 12 is separated from the layout space of the driving wheel 20 and the frictional transmission members 41 and 42 to prevent entrance of oil and dust.

The invention claimed is:

1. A roller assembly comprising:
   a rotary member including a driving shaft portion and a convey roller portion provided with the driving shaft portion, said rotary member being rotatable around an axis of the driving shaft portion;
   a driving wheel including a hole portion and attached to the driving shaft portion, said driving wheel being driven to rotate;
   a transmission receiving portion provided with the driving shaft portion, extending radially outward from the driving shaft portion, and rotating together with the driving shaft portion;
   a frictional transmission member clamped between said transmission receiving portion and a side surface of said driving wheel to frictionally transmit a rotational force of said driving wheel to said rotary member; and
   biasing means for applying a clamping force between said transmission receiving portion and the side surface of said driving wheel,
   wherein said driving shaft portion includes
   a first shaft portion on which said convey roller portion is mounted,
   a second shaft portion including a diameter smaller than that of said first shaft portion, and
   an inner hole axially extending through said driving shaft portion and concentric with said driving shaft portion,
   wherein said transmission receiving portion is disposed at a stepped portion formed between said first shaft portion and said second shaft portion,
   wherein said driving wheel is disposed on said second shaft portion, and
   wherein said biasing means comprises:
   a shaft member inserted into the inner hole;
   a pushing member disposed on an outer surface of said shaft member on the side of said second shaft portion to push said driving wheel toward said transmission receiving portion; and
   an elastic member disposed in the inner hole to apply a pushing force for pushing said driving wheel toward said transmission receiving portion to said pushing member through said shaft member.

2. The roller assembly according to claim 1, wherein said frictional transmission member comprises:
   a cylindrical portion attached to the hole portion of said driving wheel and interposed between a peripheral wall of the hole portion and the driving shaft portion; and
   a flange portion radially extending outward in the driving shaft portion from an end portion of said cylindrical portion and clamped between said transmission receiving portion and the side surface of said driving wheel.

3. The roller assembly according to claim 1, wherein said frictional transmission member comprises a first frictional transmission member disposed between said transmission receiving portion and a side surface of said driving wheel on a side of said transmission receiving portion,
   said roller assembly further comprises a second frictional transmission member disposed between a side surface of said driving wheel on a side of said pushing member and said pushing member to frictionally transmit a rotational force of said driving wheel to said rotary member, and
   said pushing member is attached to an end portion of the driving shaft portion on the side of said second shaft portion such that said pushing member is movable along an axial direction of the driving shaft portion but not rotatable with respect to the driving shaft portion.

4. The roller assembly according to claim 3, wherein said shaft member comprises an insertion hole portion at the end portion on the side of said second shaft portion, said insertion hole portion extending in a direction perpendicular to a direction in which an axis of said shaft member extends,
   said biasing means further comprises a locking pin which is inserted to said insertion hole portion and protrudes from said shaft member, and
   said pushing member comprises:
   a first hole portion to which said shaft member is inserted,
   a second hole portion to which a protruding portion is inserted, the protruding portion protruding from the end portion of said driving shaft portion on the side of said second shaft portion in a direction in which an axis of said driving shaft portion extends, and
   a groove portion accommodating a protruding portion of said locking pin which is inserted to said insertion hole portion.

5. The roller assembly according to claim 1,
   wherein said pushing member is movable along an axial direction of the driving shaft portion and is mounted on an outer surface of said shaft member on a side of said second shaft portion, and wherein said biasing means comprises:

a regulating portion disposed at an end portion of said shaft member on the side of said second shaft portion and extending radially from said rotary member; and a thrust bearing disposed between said regulating portion and said pushing member and to which said shaft member is inserted.

6. The roller assembly according to claim 1, wherein said transmission receiving portion is engaged with an engaging portion provided with said stepped portion.

7. The roller assembly according to claim 1, wherein said frictional transmission member comprises:

a first cylindrical portion fitted in the hole portion of said driving wheel and interposed between a peripheral wall of the hole portion and the driving shaft portion;

a second cylindrical portion having an inner diameter larger than said first cylindrical portion so as to surround said transmission receiving portion; and a flange portion radially extending outward from the driving shaft portion, clamped between said transmission receiving portion and a side surface of said driving wheel, and connecting said first cylindrical portion and said second cylindrical portion.

8. A roller unit comprising a plurality of roller assemblies, each of the plurality of roller assemblies comprising:

a rotary member including a driving shaft portion and a convey roller portion provided with the driving shaft portion, said rotary member being rotatable around an axis of the driving shaft portion, a driving wheel including a hole portion and attached to the driving shaft portion, said driving wheel being mounted on the driving shaft portion and being driven to rotate, a transmission receiving portion provided with the driving shaft portion, extending radially outward from the driving shaft portion, and rotating together with the driving shaft portion, a frictional transmission member clamped between said transmission receiving portion and a side surface of said driving wheel to frictionally transmit a rotational force of said driving wheel to said rotary member, and biasing means for applying a clamping force between said transmission receiving portion and the side surface of said driving wheel;

said driving shaft portion including:

a first shaft portion on which said convey roller portion is mounted, a second shaft portion including a diameter smaller than that of said first shaft portion, and an inner hole axially extending through said driving shaft portion and concentric with said driving shaft portion, said transmission receiving portion being disposed at a stepped portion formed between said first shaft portion and said second shaft portion, said driving wheel being disposed on said second shaft portion, said biasing means comprising:

a shaft member inserted into the inner hole;

a pushing member disposed on an outer surface of said shaft member on the side of said second shaft portion to push said driving wheel toward said transmission receiving portion; and an elastic member disposed in the inner hole to apply a pushing force for pushing said driving wheel toward said transmission receiving portion to said pushing member through said shaft member, the plurality of roller assemblies being disposed such that the convey roller portions are arrayed in a convey direction of a convey target;

the roller unit comprising:

a roller cover member which surrounds the plurality of convey roller portions arrayed in the convey direction;

said roller cover member comprising:

an upper wall portion including a plurality of roller opening portions from which upper portions of the convey roller portions protrude outside, a first side wall portion including a first mounting portion mounted with a first bearing portion which supports the driving shaft portion at one side of each convey roller portion, and a second side wall portion including a second mounting portion mounted with a second bearing portion which supports the driving shaft portion at the other side of each convey roller portion;

the driving shaft portion including an extending portion which extends outside the roller cover member;

said frictional transmission member and said driving wheel being disposed in said extended portion; and said roller cover member comprising a first cover member including said first side wall portion and a second cover member including said second side wall portion, which are divisible along the convey direction.

9. A roller unit comprising a plurality of roller assemblies, each of the plurality of roller assemblies comprising:

a rotary member including a driving shaft portion and a convey roller portion provided with the driving shaft portion, said rotary member being rotatable around an axis of the driving shaft portion, a driving wheel including a hole portion and attached to the driving shaft portion, said driving wheel being mounted on the driving shaft portion and being driven to rotate, a transmission receiving portion provided with the driving shaft portion, extending radially outward from the driving shaft portion, and rotating together with the driving shaft portion, a frictional transmission member clamped between said transmission receiving portion and a side surface of said driving wheel to frictionally transmit a rotational force of said driving wheel to said rotary member, and biasing means for applying a clamping force between said transmission receiving portion and the side surface of said driving wheel;

said driving shaft portion including:

a first shaft portion on which said convey roller portion is mounted, a second shaft portion including a diameter smaller than that of said first shaft portion, and an inner hole axially extending through said driving shaft portion and concentric with said driving shaft portion, said transmission receiving portion being disposed at a stepped portion formed between said first shaft portion and said second shaft portion, said driving wheel being disposed on said second shaft portion, said biasing means comprising:

a shaft member inserted into the inner hole;

a pushing member disposed on an outer surface of said shaft member on the side of said second shaft portion to push said driving wheel toward said transmission receiving portion; and an elastic member disposed in the inner hole to apply a pushing force for pushing said driving wheel toward said transmission receiving portion to said pushing member through said shaft member, the plurality of roller assemblies being disposed such that the convey roller portions are arrayed in a convey direction of a convey target;

the roller unit comprising:

a plurality of bearing portions each disposed between one end portion of each of the driving shaft portions and each of the convey roller portions to support the driving shaft portion, and a bearing support member which supports said plurality of bearing portions arrayed in the convey direction;

the driving shaft portion comprising an extended portion which extends outside said bearing support member at said one end portion; and said frictional transmission member and said driving wheel being disposed in said extended portion.

10. A conveyor apparatus comprising a plurality of roller units in a convey direction, each of the roller units comprising a plurality of roller assemblies, each of the plurality of roller assemblies comprising:

a rotary member including a driving shaft portion and a convey roller portion mounted on the driving shaft portion, said rotary member being rotatable around an axis of the driving shaft portion, a driving wheel including a hole portion and attached to the driving shaft portion, said driving wheel being mounted on the driving shaft portion and being driven to rotate, a transmission receiving portion provided with the driving shaft portion, extending radially outward from the driving shaft portion, and rotating together with the driving shaft portion, a frictional transmission member clamped between said transmission receiving portion and a side surface of said driving wheel to frictionally transmit a rotational force of said driving wheel to said rotary member, and biasing means for applying a clamping force between said transmission receiving portion and the side surface of said driving wheel;

said driving shaft portion including:

a first shaft portion on which said convey roller portion is mounted, a second shaft portion including a diameter smaller than that of said first shaft portion, and an inner hole axially extending through said driving shaft portion and concentric with said driving shaft portion, said transmission receiving portion being disposed at a stepped portion formed between said first shaft portion and said second shaft portion, said driving wheel being disposed on said second shaft portion, said biasing means comprising:

a shaft member inserted into the inner hole;

a pushing member disposed on an outer surface of said shaft member on the side of said second shaft portion to push said driving wheel toward said transmission receiving portion; and an elastic member disposed in the inner hole to apply a pushing force for pushing said driving wheel toward said transmission receiving portion to said pushing member through said shaft member, the plurality of roller assemblies being disposed such that the convey roller portions are arrayed in a convey direction of a convey target;

the roller unit comprising:

a roller cover member which surrounds the plurality of convey roller portions arrayed in the convey direction;

said roller cover member comprising:

an upper wall portion including a plurality of roller opening portions from which upper portions of the convey roller portions protrude outside, a first side wall portion including a first mounting portion mounted with a first bearing portion which supports the driving shaft portion at one side of each convey roller portion, and a second side wall portion including a second mounting portion mounted with a second bearing portion which supports the driving shaft portion at the other side of each convey roller portion;

the driving shaft portion including an extending portion which extends outside the roller cover member;

said frictional transmission member and said driving wheel being disposed in said extended portion; and said roller cover member comprising a first cover member including said first side wall portion and a second cover member including said second side wall portion, which are divisible along the convey direction;

said conveyor apparatus comprising:

a frame which supports said plurality of roller units, driving means for driving to rotate said driving wheel, and an upper cover member which covers at least upper portions of said extended portion, said driving wheel, and said frictional transmission member, and said upper cover member being formed continuous with said roller cover member and said frame.

11. A conveyor apparatus comprising a plurality of roller units in a convey direction, each of the roller units comprising a plurality of roller assemblies, each of the plurality of roller assemblies comprising:

a rotary member including a driving shaft portion and a convey roller portion provided with the driving shaft portion, said rotary member being rotatable around an axis of the driving shaft portion, a driving wheel including a hole portion and attached to the driving shaft portion, said driving wheel being mounted on the driving shaft portion and being driven to rotate, a transmission receiving portion provided with the driving shaft portion, extending radially outward from the driving shaft portion, and rotating together with the driving shaft portion, a frictional transmission member clamped between said transmission receiving portion and a side surface of said driving wheel to frictionally transmit a rotational force of said driving wheel to said rotary member, and biasing means for applying a clamping force between said transmission receiving portion and the side surface of said driving wheel;

said driving shaft portion including:

a first shaft portion on which said convey roller portion is mounted, a second shaft portion including a diameter smaller than that of said first shaft portion, and an inner hole axially extending through said driving shaft portion and concentric with said driving shaft portion, said transmission receiving portion being disposed at a stepped portion formed between said first shaft portion and said second shaft portion, said driving wheel being disposed on said second shaft portion, said biasing means comprising:
a shaft member inserted into the inner hole;
a pushing member disposed on an outer surface of said shaft member on the side of said second shaft portion to push said driving wheel toward said transmission receiving portion; and
an elastic member disposed in the inner hole to apply a pushing force for pushing said driving wheel toward said transmission receiving portion to said pushing member through said shaft member,
the plurality of roller assemblies being disposed such that the convey roller portions are arrayed in a convey direction of a convey target;
each of said roller units comprising:
a plurality of bearing portions each disposed between one end portion of each of the driving shaft portions and each of the convey roller portions to support the driving shaft portion, and
a bearing support member which supports said plurality of bearing portions arrayed in the convey direction;
the driving shaft portion comprising an extended portion which extends outside said bearing support member at said one end portion;
said frictional transmission member and said driving wheel being disposed in said extended portion;
said conveyor apparatus comprising:
a frame which supports said plurality of roller units,
driving means for driving to rotate said driving wheel, and
an upper cover member which covers at least upper portions of said extended portion, said driving wheel, and said frictional transmission member; and
said upper cover member being formed continuous with said roller cover member and said frame.

* * * * *